US012652431B2

(12) United States Patent
Zhang

(10) Patent No.: US 12,652,431 B2
(45) Date of Patent: Jun. 9, 2026

(54) VIDEO PROCESSING METHOD, VIDEO PLAYING METHOD, APPARATUS, ELECTRONIC DEVICE AND MEDIUM

(71) Applicant: BEIJING YOUZHUJU NETWORK TECHNOLOGY CO., LTD., Beijing (CN)

(72) Inventor: Kai Zhang, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 3 days.

(21) Appl. No.: 18/726,013

(22) PCT Filed: Dec. 7, 2022

(86) PCT No.: PCT/CN2022/137183
§ 371 (c)(1),
(2) Date: Jul. 1, 2024

(87) PCT Pub. No.: WO2023/124853
PCT Pub. Date: Jul. 6, 2023

(65) Prior Publication Data
US 2025/0097514 A1 Mar. 20, 2025

(30) Foreign Application Priority Data
Jan. 1, 2022 (CN) .......................... 202210000106.6

(51) Int. Cl.
*H04N 21/472* (2011.01)
*H04N 21/431* (2011.01)

(52) U.S. Cl.
CPC ....... *H04N 21/4316* (2013.01); *H04N 21/472* (2013.01)

(58) Field of Classification Search
CPC .......................... H04N 21/4316; H04N 21/472
See application file for complete search history.

(56) References Cited

U.S. PATENT DOCUMENTS

| | | | |
|---|---|---|---|
| 2014/0258029 A1* | 9/2014 | Thierry | G06Q 30/0643 |
| | | | 705/26.8 |
| 2015/0032572 A1 | 1/2015 | Calvi et al. | |
| 2023/0006961 A1* | 1/2023 | Li | H04L 51/52 |

FOREIGN PATENT DOCUMENTS

| | | |
|---|---|---|
| CN | 105407036 A | 3/2016 |
| CN | 106254925 A | 12/2016 |

(Continued)

OTHER PUBLICATIONS

ISA China National Intellectual Property Administration, International Search Report Issued in Application No. PCT/CN2022/137183, Feb. 21, 2023, WIPO, 15 pages.

(Continued)

*Primary Examiner* — Thai Q Tran
*Assistant Examiner* — Jose M Mesa
(74) *Attorney, Agent, or Firm* — Alleman Hall LLP

(57) ABSTRACT

The present application relates to a video processing method, a video playing method, apparatuses, an electronic device and a storage medium. The method comprises: receiving a resource identification adding operation for a video to be posted; in response to the resource identification adding operation, adding a resource identification to a target video to be posted, so as to display the resource identification during a playing process of the target video and display target resource information upon receiving a trigger operation on the resource identification.

12 Claims, 4 Drawing Sheets

Receive a resource identification adding operation for a video to be posted ⟶ 101

In response to the resource identification adding operation, add a resource identification to a target video to be posted, so as to display the resource identification during a playing process of the target video and display target resource information upon receiving a trigger operation on the resource identification ⟶ 102

Receive an object identification adding operation for the video to be posted ⟶ 103

In response to the object identification adding operation, add an object identification to the target video to be posted, so as to display the object identification during the playing process of the target video and display an object transfer page upon receiving a trigger operation on the object identification, so as to perform object transfer by using a target resource corresponding to the target resource information ⟶ 104

(56) References Cited

FOREIGN PATENT DOCUMENTS

| | | | |
|---|---|---|---|
| CN | 106959986 | A | 7/2017 |
| CN | 108460148 | A | 8/2018 |
| CN | 108764979 | A | 11/2018 |
| CN | 108769814 | A | 11/2018 |
| CN | 109660855 | A | 4/2019 |
| CN | 109670845 | A | 4/2019 |
| CN | 109995804 | A | 7/2019 |
| CN | 111954077 | A | 11/2020 |
| CN | 113038236 | A | 6/2021 |
| CN | 113315979 | A | 8/2021 |
| CN | 113420242 | A | 9/2021 |
| CN | 113573129 | A | 10/2021 |

OTHER PUBLICATIONS

China National Intellectual Property Administration, Office Action and Search Report Issued in Application No. 202210000106.6, Jul. 22, 2025, 14 pages.

* cited by examiner

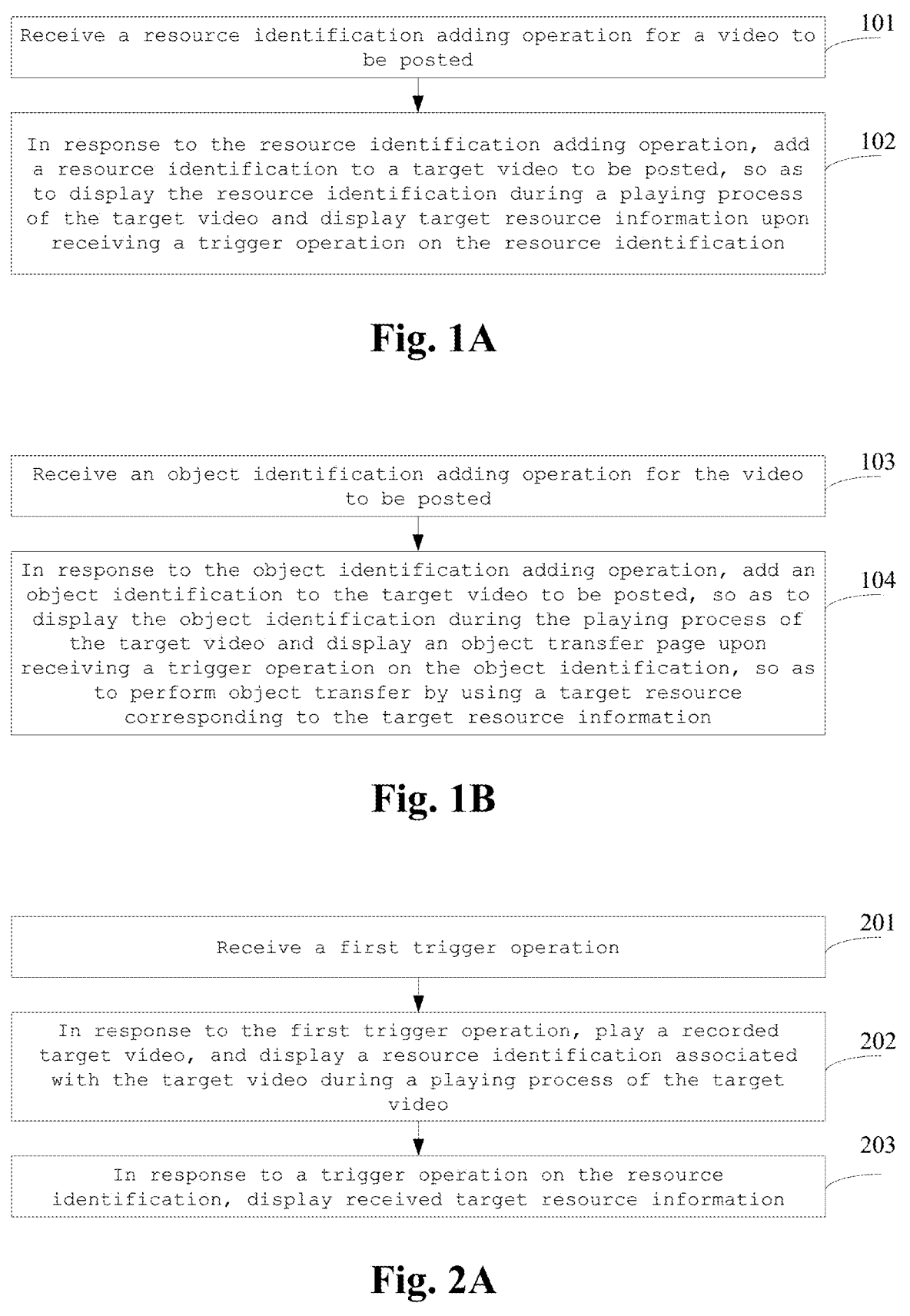

Receive a resource identification adding operation for a video to be posted ⎯ 101

In response to the resource identification adding operation, add a resource identification to a target video to be posted, so as to display the resource identification during a playing process of the target video and display target resource information upon receiving a trigger operation on the resource identification ⎯ 102

Fig. 1A

Receive an object identification adding operation for the video to be posted ⎯ 103

In response to the object identification adding operation, add an object identification to the target video to be posted, so as to display the object identification during the playing process of the target video and display an object transfer page upon receiving a trigger operation on the object identification, so as to perform object transfer by using a target resource corresponding to the target resource information ⎯ 104

Fig. 1B

Receive a first trigger operation ⎯ 201

In response to the first trigger operation, play a recorded target video, and display a resource identification associated with the target video during a playing process of the target video ⎯ 202

In response to a trigger operation on the resource identification, display received target resource information ⎯ 203

Fig. 2A

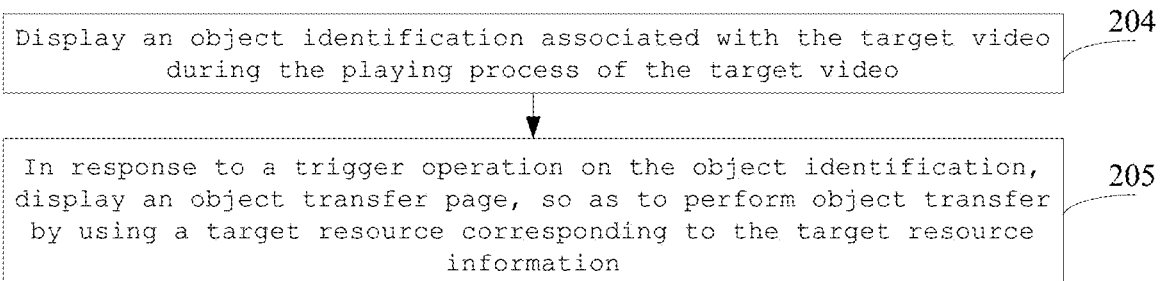

Display an object identification associated with the target video during the playing process of the target video
204

In response to a trigger operation on the object identification, display an object transfer page, so as to perform object transfer by using a target resource corresponding to the target resource information
205

Fig. 2B

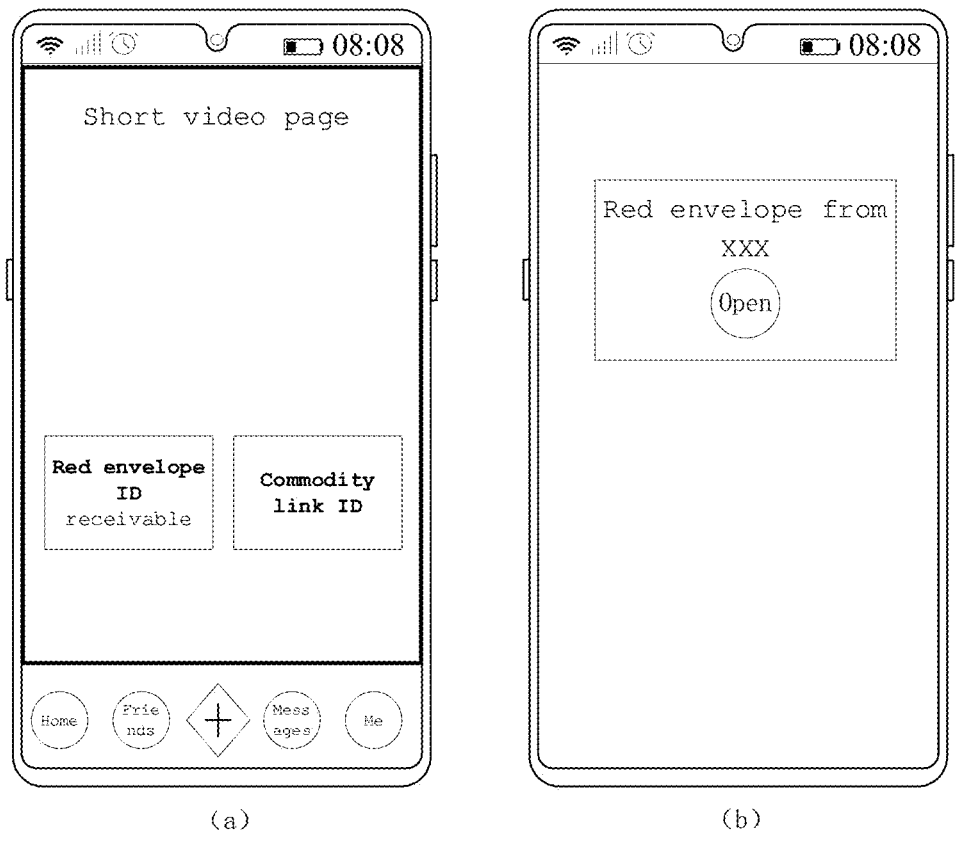

Short video page

Red envelope ID receivable

Commodity link ID

Home  Frie nds  ✛  Mess ages  Me (a)

Red envelope from XXX

Open (b)

VIDEO PROCESSING METHOD, VIDEO PLAYING METHOD, APPARATUS, ELECTRONIC DEVICE AND MEDIUM

CROSS-REFERENCE TO RELATED APPLICATIONS

The present application is based on and claims benefit of the priority to the International Patent Application No. PCT/CN2022/137183 and the Chinese Application No. 202210000106.6 filed on Jan. 1, 2022, the disclosure of which is incorporated by reference herein in its entirety.

TECHNICAL FIELD

The present application relates to the field of video technologies, and in particular, to a video processing method, a video playing method, apparatuses, an electronic device and a storage medium.

BACKGROUND

At present, in an e-commerce environment, object transfer by means of video commerce has been accepted by more and more users. Upon seeing a required object by swiping videos, the user can enter a related object transfer page to transfer the object.

SUMMARY

The present application provides a video processing method and apparatus, a video playing method, apparatuses, an electronic and a storage medium.

In one aspect of embodiments of the present application, there is provided a video processing method, including: receiving a resource identification adding operation for a video to be posted; and in response to the resource identification adding operation, adding a resource identification to a target video to be posted, so as to display the resource identification during a playing process of the target video and display target resource information upon receiving a trigger operation on the resource identification.

In another aspect of the embodiments of the present application, there is provided a video playing method, including: receiving a first trigger operation; in response to the first trigger operation, playing a recorded target video, and displaying a resource identification associated with the target video during a playing process of the target video; and in response to a trigger operation on the resource identification, displaying received target resource information.

In another aspect of the embodiments of the present application, there is provided a video processing apparatus, including: a receiving module and an adding module, the receiving module being configured to receive a resource identification adding operation for a video to be posted, and the adding module being configured to, in response to the resource identification adding operation received by the receiving module, add a resource identification to a target video to be posted, so as to display the resource identification during a playing process of the target video and display target resource information upon receiving a trigger operation on the resource identification.

In another aspect of the embodiments of the present application, there is provided a video playing apparatus, including: a receiving module, a playing module and a display module, the receiving module being configured to receive a first trigger operation, the playing module being configured to, in response to the first trigger operation received by the receiving module, play a recorded target video; and the display module being configured to display a resource identification associated with the target video during a playing process of the target video; and in response to a trigger operation on the resource identification, display received target resource information.

In another aspect of the embodiments of the present application, there is provided an electronic device, including a processor, a memory, and a computer program stored in the memory and runnable on the processor, the computer program, when executed by the processor, implementing the video processing method according to the first aspect or implementing the video playing method according to the second aspect.

In another aspect of the embodiments of the present application, there is provided a computer-readable storage medium having thereon stored a computer program which, when executed by a processor, implements the video processing method according to the above aspect or implements the video playing method according to the above aspect.

In another aspect of the embodiments of the present application, there is provided a computer program product, including a computer program which, when running on a processor, causes the processor to execute the computer program to implement the video processing method according to the above aspect or implement the video playing method according to the above aspect.

In another aspect of the embodiments of the present application, there is provided a chip, including a processor and a communication interface, the communication interface being coupled with the processor, and the processor being configured to run program instructions to implement the video processing method according to the above aspect or implement the video playing method according to the above aspect.

In another aspect of the embodiments of the present application, there is provided a computer program, including instructions which, when executed by a processor, cause the processor to implement the video processing method according to the above aspect or implement the video playing method according to the above aspect.

BRIEF DESCRIPTION OF THE DRAWINGS

The accompanying drawings herein, which are incorporated in and constitute a part of this specification, illustrate embodiments consistent with the present application and together with the description, serve to explain the principles of the present application.

In order to more clearly illustrate the technical solutions in the embodiments of the present application or the related art, the drawings that need to be used in the description of the embodiments or the related art will be briefly described below, and it is obvious that for one of ordinary skill in the art, other drawings can be obtained according to these drawings without paying out creative labor.

FIGS. 1A-1B are schematic flow diagrams of a video processing method according to an embodiment of the present application;

FIGS. 2A-2B are schematic flow diagrams of a video playing method according to an embodiment of the present application;

FIG. 3 is a schematic interface diagram of a video playing method according to an embodiment of the present application;

DETAILED DESCRIPTION

Figure 4:
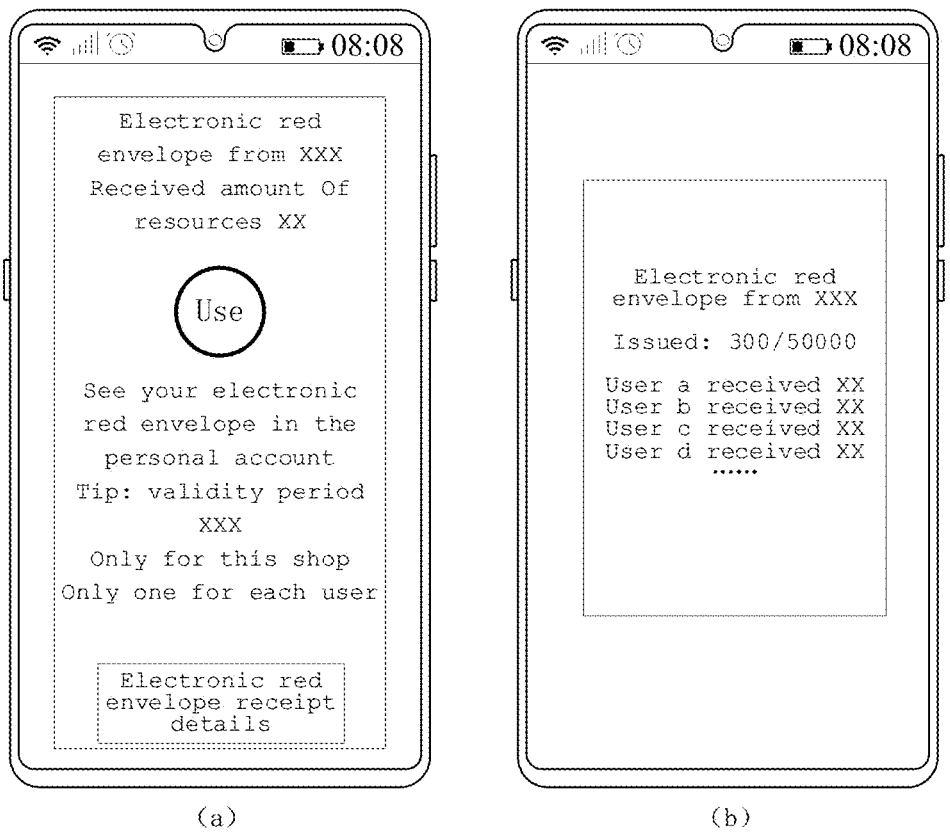
FIG. 4 is another schematic interface diagram of a video playing method according to an embodiment of the present application.

In order that the above objectives, features and advantages of the present application can be more clearly understood, solutions of the present application will be further described below. It should be noted that the embodiments of the present application and features of the embodiments may be combined with each other without conflicts.

In the following description, numerous specific details are set forth in order to provide thorough understanding of the present application, but the present application may be implemented in other ways different from those described herein; and it is obvious that the embodiments in the description are only some of the embodiments of the present application, rather than all of them.

The terms "first", "second" and the like in the description and claims of the present application, are used for distinguishing similar objects rather than for describing a specific order or sequence. It should be appreciated that the data so used can be interchanged under appropriate circumstances, such that the embodiments of the present application can be implemented in an order other than those illustrated or described herein, and that the objects distinguished by "first", "second", etc. are usually of the same class, without limiting the number of the objects, for example, a first object can be one or more. In addition, "and/or" in the description and claims represents at least one of connected objects, and a character "/" generally represents that preceding and succeeding objects associated are in an "or" relationship.

Display content in the existing video playing process usually includes limited content such as a video, an object link identification, and an object introduction in a textual form, so that the display content in the existing video playing process is too simple.

In order to solve the above technical problem, or at least partially solve it, the present application provides a video processing method, a video playing method, apparatuses, an electronic device and a storage medium.

The electronic device in the embodiments of the present application may be a mobile electronic device, or a non-mobile electronic device. The mobile electronic device may be a mobile phone, a tablet, a laptop, a palmtop, a vehicle-mounted electronic device, a wearable device, an ultra-mobile personal computer (UMPC), a netbook or a personal digital assistant (PDA), etc.; and the non-mobile electronic device may be a personal computer (PC), a television (TV), a teller machine or a self-service machine, etc.; the embodiments of the present application do not make specific limitations.

An execution subject of the video processing method provided in the embodiments of the present application may be the above electronic device (including the mobile electronic device and the non-mobile electronic device), or a functional module and/or a functional entity in the electronic device that can implement the video processing method, which may be determined specifically according to actual use requirements, and is not limited in the embodiments of the present application.

As shown in FIG. 1A, an embodiment of the present application provides a video processing method, which may include steps 101 to 102 described below.

101, receiving a resource identification adding operation for a video to be posted.

The resource identification adding operation may be a click operation or a swipe operation for adding a resource identification to the video to be posted, which is not limited in the embodiment of the present application. In the above step 101, the resource identification adding operation is specifically a click operation or a swipe operation for adding a resource identification to a target video to be posted.

102, in response to the resource identification adding operation, adding a resource identification to a target video to be posted, so as to display the resource identification during a playing process of the target video and display target resource information upon receiving a trigger operation on the resource identification.

The resource identification displayed during the playing process of the target video may be a resource control, or a resource icon, or a resource name, or the like, which is not limited in the embodiment of the present application.

In some embodiments, the above step 102 is, specifically, in response to the resource identification adding operation, adding a resource identification to a target video to be posted, so as to after the target video is posted, display the resource identification during a playing process of the target video and display target resource information upon receiving a trigger operation on the resource identification.

In the embodiment of the present application, a resource may be an electronic red envelope resource, or another electronic resource, which is not limited in the embodiment of the present application.

It should be noted that in the following embodiments of the present application, an exemplary illustration is given by taking an example that the resource is an electronic red envelope resource.

It can be understood that after the resource identification is added to the target video, the added resource identification is displayed in the process of playing the target video, so that it is possible to trigger displaying the target resource information indicated by the resource identification through the trigger operation on the resource identification.

In the embodiment of the present application, by receiving a resource identification adding operation for a video to be posted; and in response to the resource identification adding operation, adding a resource identification to a target video to be posted, it is possible to display the resource identification during a playing process of the target video and display at least one piece of resource information upon receiving a trigger operation on the resource identification. In this way, it is able to display the resource identification during the playing process of the target video and present the target resource information upon receiving the trigger operation on the resource identification, so that the video interaction mode is enriched, and the user experience is enhanced.

In some embodiments, the above step 101 may be specifically implemented by the following step 101*a* or 101*b*.

101*a*, receiving an enabling operation acting on a resource switch of a video posting page for the video to be posted.

It can be understood that the video posting page is provided with a resource switch for adding a resource identification to a video, so that it is possible to add the resource identification to the video to be posted through the enabling operation acting on the resource switch.

In some embodiments, the resource identification may be preset, or set according to actual needs.

Exemplarily, it is possible to display a setting page for a resource identification through an enabling operation acting on a resource switch, the setting page including at least one setting item, each for setting one piece of setting information of the resource identification; it is possible to obtain at least one piece of setting information through a setting operation on the at least one setting item, and add the resource identification to a target video to be posted according to the at least one piece of setting information, so as to display the resource identification according to the at least one piece of setting information during a process of playing the target video after the target video is posted.

In the embodiment of the present application, it is possible to add a resource identification to a video to be posted through an enabling operation acting on a resource switch of a video posting page for the video to be posted, so that the operation is simple, easy to understand, convenient to control, and efficient.

101*b*, receiving an adding operation for a resource sticker for the video to be posted on a video editing page.

It can be understood that the video editing page includes a plurality of different resource stickers, each for indicating one resource identification, so that it is possible to add the resource identification to the video to be posted through an adding operation for a target resource sticker, that is, the target resource sticker is used for indicating the resource identification added to the target video.

In some embodiments, the resource sticker may be a set one or may be set as needed.

Exemplarily, it is possible to display a setting page for a resource sticker through an adding operation for the resource sticker, the setting page including at least one setting item, each for setting one piece of setting information of a resource identification; it is possible to obtain at least one piece of setting information through a setting operation on the at least one setting item, and add the resource identification to a target video to be posted according to the at least one piece of setting information, so as to display the resource identification according to the at least one piece of setting information during a process of playing the target video after the target video is posted.

In the embodiment of the present application, it is possible to add a resource identification to a video to be posted through an adding operation for a resource sticker for the video to be posted on a video editing page, so that the operation is simple, easy to understand, convenient to control, and efficient.

In some embodiments, the above step 102 may be specifically implemented by the following steps 102*a* to 102*b*.

102*a*, in response to the resource identification adding operation, displaying a setting page for the resource identification.

102*b*, receiving at least one piece of setting information input through the setting page, and adding the resource identification to the target video to be posted according to the at least one piece of setting information, so as to display the resource identification according to the at least one piece of setting information during a playing process of the target video.

The at least one piece of setting information may include at least one of a position where the resource identification is displayed in the target video or information related to the target resource information, which may be set specifically according to an actual situation, and is not limited in the embodiment of the present application.

It can be understood that, it is possible to trigger receiving at least one piece of setting information through a setting operation in the setting page for the resource identification, and add the resource identification to the target video according to the at least one piece of setting information, and display the resource identification according to the at least one piece of setting information during the playing process of the target video (or display the resource identification according to the at least one piece of setting information during the playing process of the target video after the target video is posted).

In the embodiment of the present application, it is possible to add a resource identification to the target video to be posted according to at least one piece of received setting information input through the setting page, so that the resource identification can be customized according to an actual situation, which can improve user experience.

As shown in FIG. 1B, in some embodiments, after the above step 102, the video processing method provided in the embodiment of the present application may further include the following steps 103 to 104.

103, receiving an object identification adding operation for the video to be posted.

104, in response to the object identification adding operation, adding an object identification to the target video to be posted, so as to display the object identification during the playing process of the target video and display an object transfer page upon receiving a trigger operation on the object identification, so as to perform object transfer by using a target resource corresponding to the target resource information.

In the embodiment of the present application, an object may be a commodity or other content, which is not limited herein.

It should be noted that in the following embodiments, an exemplary illustration is given by taking an example that the object is a commodity.

In the embodiment of the present application, by adding an object identification to the target video, it is possible to display an object transfer page through a trigger operation on the object identification during the playing process of the target video, so as to perform object transfer by using a target resource corresponding to the target resource information. In this way, it is possible to quickly enter the object transfer page through the object identification, making it convenient for the user to understand and operate, which can improve the efficiency of entering the object transfer page.

Exemplarily, the video playing method provided in the embodiment of the present application may include, in response to an adding operation for a resource sticker for the video to be posted, displaying at least one resource sticker, each for indicating one resource identification. In response to a trigger operation on a target resource sticker corresponding to the target video, the resource identification indicated by the target resource sticker is added to the target video.

The target resource sticker is a resource sticker meeting a target condition, the target condition including at least one of: a resource activity corresponding to the target resource sticker being within an activity validity period, the target resource information corresponding to the target resource sticker having not been completely received, and the number of times of issuing the resource activity corresponding to the target resource sticker being less than or equal to an issuance threshold. The target condition may also include another feasibility condition, which is not limited in the embodiment of the present application.

It can be understood that, only when the resource activity corresponding to the target resource sticker is within the activity validity period, a resource label can be added to the target video through the target resource sticker; when the resource activity corresponding to the target resource sticker is not the activity validity period, a resource label cannot be added to the target video through the target resource sticker. In the embodiment of the present application, the activity validity period of the resource activity corresponding to the target resource sticker may be configured or not be configured (if not configured, this shows that the resource activity corresponding to the target resource sticker is always valid), which may be determined specifically according to an actual situation, and is not limited in the embodiment of the present application.

It can be understood that, only when the target resource information corresponding to the target resource sticker has not been completely received, the resource label can be added to the target video through the target resource sticker; when the target resource information corresponding to the target resource sticker has been completely received, the resource label cannot be added to the target video through the target resource sticker.

It can be understood that, only when the number of times of issuing the resource activity is less than or equal to the issuance threshold, the resource label can be added to the target video through the target resource sticker; when the number of times of issuing the resource activity is greater than the issuance threshold, the resource label cannot be added to the target video through the target resource sticker. In the embodiment of the present application, the issuance threshold may be configured according to an actual situation, and the issuance threshold may be 3 or other finite numbers, or be infinite, that is, the number of times of issuing is not limited.

The target condition is a limitation condition for adding the resource identification to the target video, which can be set according to an actual situation.

In the embodiment of the present application, adding the resource identification to the target video is limited through the target condition, so that a proper resource identification can be added to the target video.

Exemplarily, taking an example that the resource is an electronic red envelope resource, the target condition includes at least one of: a red envelope activity corresponding to the target red envelope sticker being within an activity validity period, target red envelope information corresponding to the target red envelope sticker being not completely received, and the number of times of issuing the red envelope activity corresponding to the target red envelope sticker being less than or equal to an issuance threshold. The target condition may also include another feasibility condition, which is not limited in the embodiment of the present application.

Exemplarily, a merchant (brand owner) configures, according to consumption (verification process of the user's actual consumption (consumed by purchasing a commodity)) of issued amount of resources confirmed with e-commerce, a ratio of a total resource issued amount of resources to a total inventory of shopping resource coupons (i.e. a ratio of a total budget of electronic resources issued to the user to a total inventory of electronic resources), and thereby sets the target condition.

Exemplarily, the merchant can, according to needs of promotional activities, set red envelope stickers for different red envelope activities in a card-coupon center of an e-commerce card-coupon center management terminal, and set a limitation condition for adding a red envelope activity to a video. The merchant can also select a corresponding red envelope sticker according to content of the video so as to add a proper red envelope activity to the video, and then after generating a video page including a red envelope identification indicating a newly added red envelope activity, post a video including the red envelope identification. Upon watching the video including the red envelope identification, the user can receive a corresponding electronic red envelope of the red envelope activity through the red envelope identification, and then purchase a commodity using the electronic red envelope in a shopping page indicated by an object identification included in a target video.

Exemplarily, the merchant, when setting the red envelope sticker, may configure: a red envelope activity name displayed when the video is played, a unique identification for indicating the red envelope activity, a user identification (UID) allowed to post the target video including the red envelope identification, a user allowed to receive the electronic red envelope corresponding to the red envelope activity, a ratio of the total budget to the total inventory for issuing red envelopes to the user, timeliness of the red envelope activity, timeliness of the electronic red envelope, a type of the electronic red envelope, the number of the red envelope activities which can be carried by one video, information on amount of resources of each electronic red envelope, a total amount of resources of a lucky-draw red envelopes, content information of video playing, and the like.

An embodiment of the present application further provides a video playing method, wherein an execution subject of the video playing method may be the above electronic device (including the mobile electronic device and the non-mobile electronic device), or a functional module and/or a functional entity in the electronic device that can implement the video playing method, which can be determined specifically according to actual use requirements, and is not limited in the embodiment of the present application.

As shown in FIG. 2A, an embodiment of the present application provides a video playing method, which may include the following steps 201 to 203.

201, receiving a first trigger operation.

The first trigger operation can be any operation for triggering playing the target video. In some embodiments, the first trigger operation may be a click operation, a swipe operation, or another feasible operation, which is not limited in the embodiment of the present application.

Exemplarily, the above click operation may be a single click operation, a double click operation, a long press operation, and the like, and the above swipe operation may be a swipe operation to any direction, and may be a double-finger swipe operation, and the like, which may be determined specifically according to an actual situation, and are not limited herein.

202, in response to the first trigger operation, playing a recorded target video, and displaying a resource identification associated with the target video during a playing process of the target video.

The resource identification may be displayed throughout the playing process of the target video, or may be displayed when a target video frame or a target video segment of the target video is played, which may be determined specifically according to an actual situation, and is not limited in the embodiment of the present application.

203, in response to a trigger operation on the resource identification, displaying received target resource information.

Exemplarily, the target resource information may be information related to the electronic red envelope (specifically, see the detailed description of the information related to the electronic red envelope in the following embodiment), or the information related to the red envelope activity (specifically, see the detailed description of the information related to the red envelope activity in the following embodiment).

It can be understood that, in the embodiment of the present application, playing a target video is triggered through a first trigger operation, a resource identification associated with the target video is displayed during a playing process of the target video, and then in response to a trigger operation on the resource identification, received target resource information is displayed. On one hand, the resource identification can be displayed during the playing process of the target video, and the target resource information can be presented upon receiving the trigger operation on the resource identification, which enriches the video interaction mode and improves user experience. On the other hand, by watching the target video, not only a required object can be determined but also promotional information of the object can be obtained, without the need of jumping to a transfer page of the object and then determining whether the promotional information exists, which can improve the transfer efficiency of the object and enhance user experience.

As shown in FIG. 2B, in some embodiments, the method further includes the following steps 204-205.

204, displaying an object identification associated with the target video during the playing process of the target video.

205, in response to a trigger operation on the object identification, displaying an object transfer page, so as to perform object transfer by using a target resource corresponding to the target resource information.

It can be understood that, in the embodiment of the present application, it is possible to display an object transfer page through a trigger operation on an object identification associated with the target video, so as to perform object transfer by using a target resource corresponding to the target resource information. Therefore, the operation is convenient, easy to understand, and convenient to control, and the operation efficiency can be improved.

In some embodiments, the target resource information may include information associated with the object transfer page (for example, target red envelope information includes a jump control (for jumping to an object transfer page), then it is possible to trigger jumping to the object transfer page through a trigger operation on the jump control), and therefore, it is also possible to display an object transfer page through a trigger operation on the target resource information, so as to perform object transfer by using a target resource corresponding to the target resource information.

Hereinafter, a resource is a red envelope, a resource identification is a red envelope identification, such as a red envelope control, and a red envelope sticker; a resource sticker can be a red envelope sticker, and resource information is information related to the red envelope, such as the type of the red envelope, the number of the red envelope, a validity period of the red envelope, and a value of the red envelope; an object can be a commodity, an object identification is a commodity link identification, and an object transfer page is a commodity purchase page. An exemplary illustration of the above video playing method is given below by taking an example that the target video is a short video. The video playing method includes the following first to second steps.

A first step, receiving a first trigger operation.

A second step, in response to the first trigger operation, playing a short video, and displaying a commodity link identification and a red envelope identification associated with the short video during a playing process of the short video.

The commodity link identification is used for indicating a purchase page for a commodity, the red envelope identification is used for indicating at least one red envelope activity, and an electronic red envelope corresponding to each red envelope activity is used for indicating a reduced amount of resources for shopping upon purchasing the commodity in the purchase page.

The red envelope identification may be a red envelope control, or a red envelope icon, or another identification indicating the red envelope, which is not limited herein. The commodity link identification may be a control associated with a commodity link, or an icon associated with the commodity link, or another identification associated with the commodity link, which is not limited herein.

The red envelope identification may indicate one or more red envelope activities, and if one red envelope activity is a regular red envelope activity, namely a red envelope activity with a fixed amount of resources, an electronic red envelope corresponding to the one red envelope activity is an electronic red envelope with a fixed amount of resources; and if one red envelope activity is a random red envelope activity, namely a red envelope activity with a random amount of resources, an electronic red envelope corresponding to the one red envelope activity is an electronic red envelope with a random amount of resources.

In some embodiments, a short video page may include at least one of the above red envelope identifications.

It can be understood that the short video is a short video for commerce, the commodity link identification is a commodity promoted in the short video, the purchase page for a commodity is a purchase page for the commodity promoted in the short video, and the electronic red envelope corresponding to each red envelope activity indicated by the red envelope identification is a red envelope which can be used for purchasing the commodity promoted in the short video, that is, upon purchasing the commodity promoted in the short video, an amount of resources for shopping can be reduced by using the electronic red envelope corresponding to the red envelope activity indicated by the red envelope identification.

In the embodiment of the present application, in response to a first trigger operation, a short video is played, and during the playing process of the short video, in addition to a commodity link identification (for indicating a purchase page for a commodity) associated with the short video, a red envelope identification for indicating at least one red envelope activity is also displayed, an electronic red envelope corresponding to each red envelope activity being used for indicating a reduced amount of resources for shopping upon purchasing the commodity in the purchase page. In this solution, on one hand, the short video page has therein added the red envelope identification, through which the electronic red envelope of the commodity associated with the short video can be obtained, so that the video interaction mode is enriched, and the user experience is enhanced. On the other hand, through the short video page, not only the required commodity can be determined, but also promotional information of the commodity can be obtained, without the need of jumping to the purchase page for the commodity and then determining whether the promotional information exists. Thus the purchasing efficiency of the commodity can be improved, and the user experience is enhanced.

In some embodiments, the red envelope identification is used for indicating one red envelope activity, and the red envelope identification is further used for indicating at least one of: an electronic red envelope corresponding to the one red envelope activity being receivable or un-receivable, or a user type for which the electronic red envelope corresponding to the one red envelope activity is receivable.

The red envelope identification is further used for indicating that the electronic red envelope corresponding to the one red envelope activity is un-receivable. As can be understood, this may be because the one red envelope activity indicated by the red envelope identification has expired, or the red envelope identification is further used for indicating that the electronic red envelope corresponding to the one red envelope activity has been completely received, and thus the electronic red envelope corresponding to the one red envelope activity indicated by the red envelope identification might be un-receivable.

It can be understood that, if the red envelope identification indicates that the electron red envelope corresponding to the one red envelope activity is receivable, then the electron red envelope can be received through a trigger operation for receiving the electron red envelope, that is, the red envelope can be snatched. If the red envelope identification indicates that the electron red envelope corresponding to the one red envelope activity is un-receivable, then the electron red envelope cannot been received through the trigger operation for receiving the electron red envelope, that is, the red envelope cannot be snatched.

In the embodiment of the present application, if the red envelope identification is further used for indicating that the electronic red envelope corresponding to the one red envelope activity is receivable, it can trigger receiving the electronic red envelope directly through a trigger operation on the red envelope identification. If the red envelope identification is further used for indicating that the electronic red envelope corresponding to the one red envelope activity is un-receivable, it can prompt that the user cannot receive the electronic red envelope, so as to avoid the case that the user would receive the electronic red envelope through the trigger operation on the red envelope identification but does not receive it, reducing the user experience.

The red envelope identification is further used for indicating the user type for which the electronic red envelope corresponding to the one red envelope activity is receivable. The user type includes all fans or all users watching the short video, which may be determined specifically according to an actual situation, and is not limited in the embodiment of the present application.

In the embodiment of the present application, the red envelope identification is further used for indicating the user type for which the electronic red envelope corresponding to the one red envelope activity is receivable. Then, the user can, according to the red envelope identification, determine whether the electronic red envelope of the red envelope activity indicated by the red envelope identification is receivable by the user himself, so as to improve the operation efficiency of the user and improve the user experience.

In some embodiments, in the embodiment of the present application, if the red envelope identification indicates one red envelope activity, it is possible to directly display information related to a received target electronic red envelope corresponding to the one red envelope activity by triggering and inputting the red envelope identification, and save the target electronic red envelope to a user personal account.

In some embodiments, in the embodiment of the present application, it is possible to trigger displaying the target electronic red envelope through a trigger operation on the red envelope identification, and save the target electronic red envelope to a user personal account.

In some embodiments, after the above second step, the video playing method provided in the embodiment of the present application may further include the following third to sixth steps.

A third step, receiving a second trigger operation on the red envelope identification.

The second trigger operation is any operation for triggering displaying at least one red envelope activity indicated by the red envelope identification. The second trigger operation may be a click operation on the red envelope identification, or a swipe operation on the red envelope identification, or another feasible operation, which is not limited in the embodiment of the present application.

Exemplarily, for the description of the above click operation and swipe operation, reference may be made to the relevant description of the click operation and the swipe operation in the description of the first trigger operation in the above first step, which is not repeated herein.

A fourth step, in response to the second trigger operation, displaying at least one red envelope activity indicated by the red envelope identification.

In the embodiment of the present application, one red envelope activity is one activity for receiving a red envelope, namely one activity where a red envelope is receivable, and can be a red envelope sticker.

A fifth step, receiving a third trigger operation on a target red envelope activity in the at least one red envelope activity.

The target red envelope activity is any red envelope activity in the at least one red envelope activity, and the third trigger operation is a click operation on the target red envelope activity, or a swipe operation on the target red envelope activity, or another feasible operation, which is not limited in the embodiment of the present application.

Exemplarily, for the description of the above click operation and swipe operation, reference may be made to the relevant description of the click operation and the swipe operation in the description of the first trigger operation in the above first step, which is not repeated herein.

A sixth step, in response to the third trigger operation, displaying information related to the electronic red envelope of the target electronic red envelope received based on the target red envelope activity, and saving the target electronic red envelope to a user personal account.

The related information includes information on amount of resource of the target electronic red envelope.

In the embodiment of the present application, displaying at least one red envelope activity is triggered through a second trigger operation, displaying information related to a received target electronic red envelope is triggered through a third trigger operation, and the target electronic red envelope is saved to a user personal account, so that the operation is simple, the receiving of the electronic red envelope is efficient, and the information related to the electronic red envelope can be known, improving the user experience.

In some embodiments, the information related to the electronic red envelope further includes at least one of: discounts on purchases information of the target electronic red envelope, usable period information of the target electronic red envelope, usable commodity information of the target electronic red envelope, usable purchase route information of the target electronic red envelope, storage path information of the target electronic red envelope, prompt information of successful receipt of the target electronic red envelope, a jump control for a usable shopping page of the target electronic red envelope, or a jump control for receipt details of the target electronic red envelope. The information related to the electronic red envelope may also include other information, which is not limited in the embodiment of the present application.

Exemplarily, the discounts on purchases information of the target electronic red envelope may be, for example, "get the electronic red envelope OFF for purchase when meeting the minimum consumption threshold (for example, get 20 off for every 100 spent)", or "usable when consumed amount of resources is over a consumption threshold (for example, usable when consumed amount of resources is over 200)", which may be determined specifically according to an actual situation, and is not limited in the embodiment of the present application.

Exemplarily, the usable period information of the target electronic red envelope may be, for example, "a valid use time period of the target electronic red envelope", "the target electronic red envelope can be used before a first time point (or the target electronic red envelope cannot be used after a first time point)", "there is a first duration left before expiration of the target electronic red envelope", or the like, which may be determined specifically according to an actual situation, and is not limited in the embodiment of the present application.

Exemplarily, the usable commodity information of the target electronic red envelope may be, for example, "the target electronic red envelope is usable to purchase any commodity in this shop", "the target electronic red envelope is usable to purchase a specified commodity", or the like, which may be determined specifically according to an actual situation, and is not limited in the embodiment of the present application.

Exemplarily, the usable purchase route information of the target electronic red envelope may be, for example, "the target electronic red envelope is usable to purchase a specified commodity in any platform", "the target electronic red envelope is usable only in a live room platform", "the target electronic red envelope is usable only for purchase in this shop", or the like, which may be determined specifically according to an actual situation, and is not limited in the embodiment of the present application Exemplarily, the storage path information of the target electronic red envelope may be, for example, "the target electronic red envelope has been saved to the user personal account", "the target electronic red envelope has been saved to the 'user personal account'—'card and coupon'—'red envelope for shopping'", or the like, which may be determined specifically according to an actual situation, and is not limited in the embodiment of the present application.

Exemplarily, the prompt information of successful receipt of the target electronic red envelope may be, for example, "the red envelope has been successfully received", "received", "saved to the user personal account", or the like, which may be determined specifically according to an actual situation, and is not limited in the embodiment of the present application.

Exemplarily, on the jump control for a usable shopping page of the target electronic red envelope, there may have prompt information such as "use", "to use", "purchase", and "to purchase", which may be determined specifically according to an actual situation, and is not limited in the embodiment of the present application.

Exemplarily, on the jump control for receipt details of the target electronic red envelope, there may have prompt information such as "receipt details", "states of receiving the electronic red envelope", or the like, which may be determined specifically according to an actual situation, and is not limited in the embodiment of the present application. The receipt details of the target electronic red envelope may include the number of the received target electronic red envelope of the target red envelope activity, the total number of the target electronic red envelope of the target red envelope activity, information on amount of resource of each received target electronic red envelope, or the like, which may be determined specifically according to an actual situation, and is not limited in the embodiment of the present application.

In the embodiment of the present application, various information related to the electronic red envelope is provided, whose specific content can be determined specifically according to an actual situation, and the user can obtain detailed information of a target electronic red envelope according to the information related to the electronic red envelope, so that the user experience can be improved.

In some embodiments, the each red envelope activity includes the information related to the red envelope activity including at least one of: receivable period information of the corresponding electronic red envelope, information of the remaining number of the corresponding electronic red envelope, information of the total number of the corresponding electronic red envelope, corresponding electronic red envelope type information, discount information of the corresponding electronic red envelope, usable period information of the corresponding electronic red envelope, usable commodity information of the corresponding electronic red envelope, and usable purchase route information of the corresponding electronic red envelope, wherein the electronic red envelope type information is used for indicating that the type of the electronic red envelope is a random amount type or a fixed amount type. The information related to the red envelope activity may also include other content information, which is not limited in the embodiment of the present application.

The receivable period information of the corresponding electronic red envelope refers to a validity period of the red envelope activity, that is, a period when the electronic red envelope can be received. In the embodiment of the present application, the usage validity period information of the electronic red envelope may be the same as or different from the receivable period information of the electronic red envelope, which may be determined specifically according to an actual situation, and is not limited in the embodiment of the present application.

Exemplarily, the receivable period information of the electronic red envelope may be a receivable time period of the electronic red envelope, or the electronic red envelope being receivable before a second time point, or there being a second duration left until the end of the red envelope activity, or the like, which may be determined specifically according to an actual situation, and is not limited in the embodiment of the present application.

An end time point of the receivable time period of the electronic red envelope is earlier than that of the usable time period of the electronic red envelope. The second time point is the same as the first time point, or the second time point is earlier than the first time point. The second duration is less than or equal to the first duration.

The information of the remaining number of the electronic red envelope, the information of the total number of the electronic red envelopes, and the electronic red envelope type information can respectively indicate the remaining number of the electronic red envelope and the total number of the electronic red envelope, and the type of the electronic red envelope is a random amount type or a fixed amount type.

The random amount type indicates that the amount of resources of the electronic red envelope is random, and the random amount type of electronic red envelope can also be called a lucky-draw red envelope; and the fixed amount type indicates that the amount of resources of the electronic red envelope is fixed, and the fixed amount type of electronic red envelope can also be called a regular red envelope.

For the description of the discounts on purchases information of the electronic red envelope, the usable period information of the electronic red envelope, the usable commodity information of the electronic red envelope, and the usable purchase route information of the electronic red envelope, reference may be made to the above description related to the discounts on purchases information of the target electronic red envelope, the usable period information of the target electronic red envelope, the usable commodity information of the target electronic red envelope, and the usable purchase route information of the target electronic red envelope, which are not repeated herein.

In the embodiment of the present application, various information that the red envelope activity can indicate is provided, so that the user can obtain some information of the electronic red envelope according to the information indicated by the red envelope activity, facilitating determining whether the electronic red envelope is required by the user, avoiding missing an electronic red envelope required or receiving an electronic red envelope not required, and then improving the receiving efficiency of the electronic red envelope.

In some embodiments, after the above sixth step, the video playing method provided in the embodiment of the present application may further include the following seventh to eighth steps.

A seventh step, in response to a fourth trigger operation on the commodity link identification, displaying the shopping page.

The fourth trigger operation is a click operation on the commodity link identification, or a swipe operation on the commodity link identification, or another feasible operation, which is not limited in the embodiment of the present application.

Exemplarily, for the description of the above click operation and swipe operation, reference may be made to the relevant description of the click operation and the swipe operation in the description of the first trigger operation in the above first step, which is not repeated herein.

An eighth step, in response to a fifth trigger operation on the shopping page, displaying a transaction information page, the transaction information page including consumption information of shopping by using the target electronic red envelope.

The fifth trigger operation is an operation for purchasing a commodity in the shopping page, and the fifth trigger operation is a click operation on the shopping page, or a swipe operation on the shopping page, or another feasible operation, which is not limited in the embodiment of the present application.

Exemplarily, for the description of the above click operation and swipe operation, reference may be made to the relevant description of the click operation and the swipe operation in the description of the first trigger operation in the above first step, which is not repeated herein.

In the embodiment of the present application, a shopping page indicated by a commodity link identification is displayed through a fourth trigger operation on the commodity link identification, and then displaying a transaction information page including consumption information of shopping by using the target electronic red envelope is triggered through a fifth trigger operation on the shopping page. In this way, a commodity can be purchased on the shopping page indicated by the commodity link identification through the target electronic red envelope received by the red envelope identification, so that the user can know the promotion of the commodity in the short video page, receive the electronic red envelope and purchase the required commodity on the shopping page, without the need of going to the shopping page to search for a coupon or to another platform to search for the promotion of the corresponding commodity, which can improve the purchase efficiency, increase commodity sales, and enhance the user experience.

In some embodiments, the video playing method provided in the embodiment of the present application may further include the following ninth to the tenth steps.

A ninth step, receiving a sixth trigger operation on a red envelope for shopping identification of a user personal account page.

The red envelope for shopping identification is used for indicating a red envelope for shopping page.

The sixth trigger operation is a click operation on the red envelope for shopping identification, or a swipe operation on the red envelope for shopping identification, or another feasible operation, which is not limited in the embodiment of the present application.

Exemplarily, for the description of the above click operation and swipe operation, reference may be made to the relevant description of the click operation and the swipe operation in the description of the first trigger operation in the above first step, which is not repeated herein.

A tenth step, in response to the sixth trigger operation, displaying a red envelope for shopping page.

The red envelope for shopping page includes: a usable electronic red envelope subpage, an invalidated electronic red envelope subpage, a used electronic red envelope subpage.

It can be appreciated that, the usable electronic red envelope subpage is used for displaying a usable electronic red envelope (an unexpired and unused electronic red envelope); the invalidated electronic red envelope subpage is used for displaying an expired and unusable electronic red envelope; and the used electronic red envelope subpage is used for displaying an electronic red envelope used by previous purchase of a commodity.

If the user personal account includes at least one usable electronic red envelope, the usable electronic red envelope subpage includes the at least one usable electronic red envelope, and if the user personal account does not include the usable electronic red envelope, the usable electronic red envelope subpage does not include the usable electronic red envelope. In this way, the user can know which commodities or which shops have promotional activities according to the usable electronic red envelope included in the usable electronic red envelope subpage, and therefore, he/she can purchase a commodity by using the corresponding usable electronic red envelope according to actual needs, without searching for the short video corresponding to the required commodity from the short video stream again, so that the purchasing efficiency can be improved, and the user experience can be enhanced.

If the user personal account includes at least one expired electronic red envelope, the invalidated electronic red envelope subpage includes the at least one expired electronic red envelope, and if the user personal account does not include an expired electronic red envelope, the invalidated electronic red envelope subpage does not include a usable electronic red envelope. In this way, the user can, according to the invalidated electronic red envelope subpage, determine which of the received electronic red envelopes have expired, and can no longer be used to purchase a commodity, so as to avoid that the user finds out that he cannot be offered a discount due to the expiration of the electronic red envelope when or after purchasing the commodity, lowering the user experience.

If the user personal account includes at least one used electronic red envelope, the used electronic red envelope subpage includes the at least one usable electronic red envelope, and if the user personal account does not include a used electronic red envelope, the used electronic red envelope subpage does not include a usable electronic red envelope. In this way, the user can, according to the used electronic red envelope in the used electronic red envelope subpage, quickly know which commodities have been purchased with discounts and which commodities have been purchased and the like, without searching for orders one by one, so that the user experience can be improved.

Exemplarily, as shown in (a) of FIG. 3, when watching the short video page, the user clicks on "red envelope identification", and a red envelope activity as shown in (b) of FIG. 3 is displayed; the user clicks on "open", and the information related to a received electronic red envelope as shown in (a) of FIG. 4 is displayed; and the user clicks on "electronic red envelope receipt details", and the electronic red envelope receipt detail information as shown in (b) of FIG. 4 is displayed.

Figure 5:
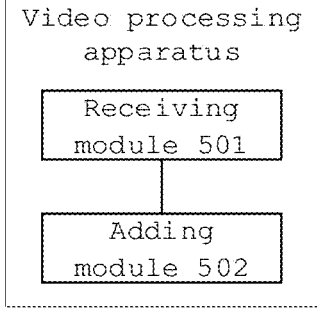
FIG. 5 is a structural block diagram of a video processing apparatus according to an embodiment of the present application.

FIG. 5 is a structural block diagram of a video playing apparatus according to an embodiment of the present application, and as shown in FIG. 5, the apparatus includes: a receiving module 501 and an adding module 502, the receiving module 501 being configured to receive a resource identification adding operation for a video to be posted; and the adding module 502 being configured to, in response to the resource identification adding operation received by the receiving module 501, add a resource identification to a target video to be posted, so as to display the resource identification during a playing process of the target video and display target resource information upon receiving a trigger operation on the resource identification.

In some embodiments, the receiving module 501 is specifically configured to receive an enabling operation acting on a resource switch of a video posting page for the video to be posted; or receive an adding operation for a resource sticker for the video to be posted on a video editing page.

In some embodiments, the adding module 502 is specifically configured to, in response to the resource identification adding operation received by the receiving module 501, display a setting page for the resource identification; and receive at least one piece of setting information input through the setting page, and add the resource identification to the target video according to the at least one piece of setting information, so as to display the resource identification according to the at least one piece of setting information during the playing process of the target video.

In some embodiments, the receiving module 501 is further configured to, in response to the resource identification adding operation, receive an object identification adding operation for the video to be posted after the resource identification is added to the target video; and the adding module 502 is further configured to, in response to the object identification adding operation received by the receiving module 501, add an object identification to the target video to be posted, so as to display the object identification during the playing process of the target video and display an object transfer page upon receiving a trigger operation on the object identification, so as to perform object transfer by using a target resource corresponding to the target resource information.

Figure 6:
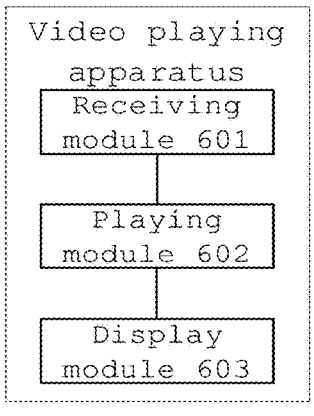
FIG. 6 is a structural block diagram of a video playing apparatus according to an embodiment of the present application.

FIG. 6 is a structural block diagram of a video playing apparatus according to an embodiment of the present application, as shown in FIG. 6, the apparatus including: a receiving module 601, a playing module 602 and a display module 603, the receiving module 601 being configured to receive a first trigger operation; the playing module 602 being configured to, in response to the first trigger operation received by the receiving module 601, play a recorded target video; and the display module 603 being configured to display a resource identification associated with the target video during a playing process of the target video; and in response to a trigger operation on the resource identification, display received target resource information.

In some embodiments, the display module 603 is further configured to display an object identification associated with the target video during the playing process of the target video; and in response to a trigger operation on the object identification, display an object transfer page, so as to perform object transfer by using a target resource corresponding to the target resource information.

In the embodiment of the present application, the modules can implement the video playing method provided in the above method embodiment, and can achieve the same technical effect, which is not repeated here in order to avoid repetition.

Figure 7:
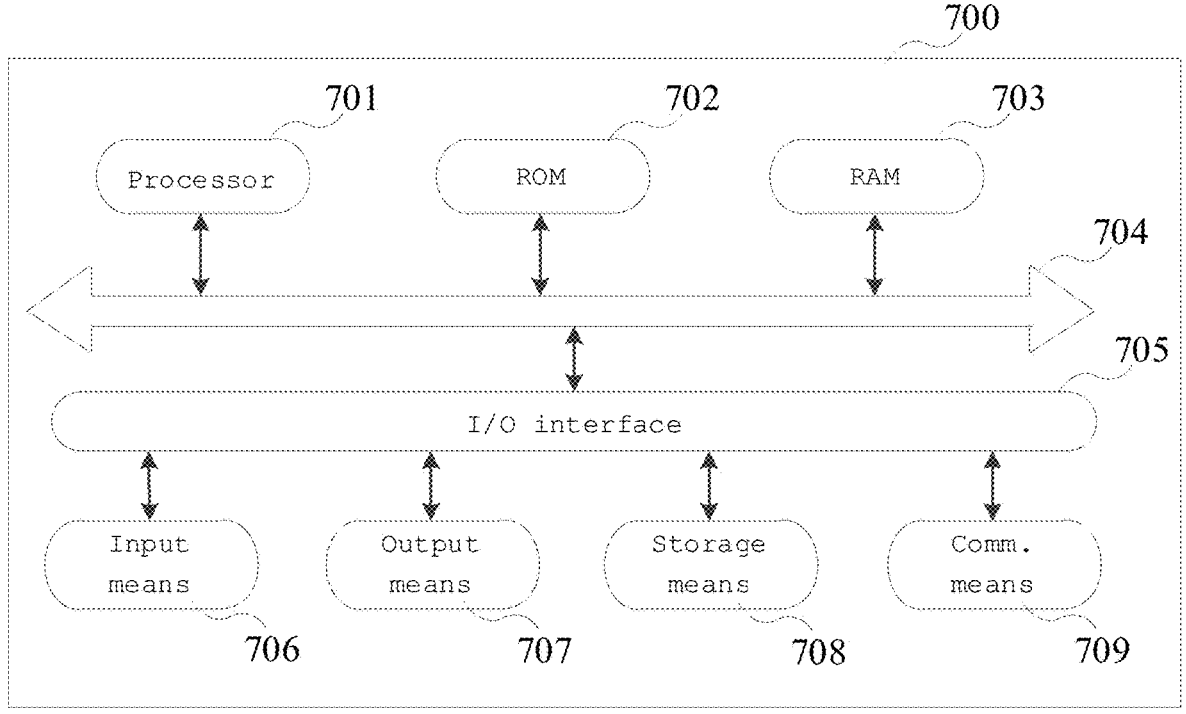
FIG. 7 is a structural block diagram of an electronic device according to an embodiment of the present application.

FIG. 7 is a schematic structural diagram of an electronic device according to an embodiment of the present disclosure, which is used to exemplarily illustrate an electronic device that implements any video processing method or video playing method in the embodiment of the present disclosure, and should not be construed as a specific limitation to the embodiment of the present disclosure.

As shown in FIG. 7, the electronic device 700 may include a processor (e.g., central processing unit, graphics processing unit, etc.) 701, which may perform various appropriate actions and processes according to a program stored in a read-only memory (ROM) 702 or a program loaded from a storage means 708 into a random access memory (RAM) 703. In the RAM 703, various programs and data required for the operation of the electronic device 700 are also stored. The processor 701, the ROM 702, and the RAM 703 are connected to each other by a bus 704. An input/output (I/O) interface 705 is also connected to the bus 704.

Generally, the following means may be connected to the I/O interface 705: an input means 706 including, for example, a touch screen, touch pad, keyboard, mouse, camera, microphone, accelerometer, gyroscope, etc.; an output means 707 including, for example, a liquid crystal display (LCD), speaker, vibrator, etc.; the storage means

708, including, for example, a magnetic tape, hard disk, etc.; and a communication means 709. The communication means 709 may allow the electronic device 700 to communicate with other devices, wirelessly or by wire, to exchange data. While the electronic device 700 with the various means is illustrated, it should be understood that not all illustrated means are required to be implemented or provided. More or fewer means may be alternatively implemented or provided.

In particular, according to the embodiments of the present disclosure, the processes described above with reference to the flow diagrams may be implemented as a computer software program. For example, an embodiment of the present disclosure includes a computer program product, which includes a computer program carried on a non-transitory computer-readable medium, the computer program containing program code for performing the method illustrated by the flow diagram. In such an embodiment, the computer program may be downloaded and installed from a network via the communication means 709, or installed from the storage means 708, or installed from the ROM 702. When executed by the processor 701, the computer program may execute the functions defined in any video processing method or video playing method provided in the embodiments of the present disclosure.

An embodiment of the present disclosure includes a computer program including instructions which, when executed by a processor, cause the processor to implement the video processing method provided in the embodiment of the present disclosure or the video playing method provided in the embodiment of the present disclosure.

It should be noted that the above computer-readable medium of the present disclosure may be a computer-readable signal medium or a computer-readable storage medium or any combination of the above two. The computer-readable storage medium may be, for example, but is not limited to, an electronic, magnetic, optical, electromagnetic, infrared, or semiconductor system, apparatus, or device, or any combination of the foregoing. More specific examples of the computer-readable storage medium may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium containing or storing a program, wherein the program can be used by or in conjunction with an instruction execution system, apparatus, or device. However, in the present disclosure, the computer-readable signal medium may include a data signal propagated in baseband or as part of a carrier wave, in which computer-readable program code is carried. Such a propagated data signal may take a variety of forms, including, but not limited to, an electromagnetic signal, optical signal, or any suitable combination of the forgoing. The computer-readable signal medium may also be any computer-readable medium other than the computer-readable storage medium, wherein the computer-readable signal medium can send, propagate, or transmit a program for use by or in conjunction with an instruction execution system, apparatus, or device. The program code contained on the computer-readable medium may be transmitted using any appropriate medium, including but not limited to: a wire, an optical cable, RF (Radio Frequency), etc., or any suitable combination of the foregoing.

In some implementations, a client and a server may communicate using any currently known or future developed network protocol, such as HTTP (HyperText Transfer Protocol), and may be interconnected with any form or medium of digital data communication (e.g., a communication network). Examples of the communication network include a local area network ("LAN"), a wide area network ("WAN"), an internet (e.g., the Internet), and a peer-to-peer network (e.g., an ad hoc peer-to-peer network), as well as any currently known or future developed network.

The above computer-readable medium may be contained in the above electronic device; or may exist separately without being assembled into the electronic device.

The above computer-readable medium has thereon carried one or more programs which, when executed by the electronic device, cause the electronic device to: receive a resource identification adding operation for a video to be posted; and in response to the resource identification adding operation, add a resource identification to a target video to be posted, so as to display the resource identification during a playing process of the target video and display target resource information upon receiving a trigger operation on the resource identification.

Alternatively, the above computer-readable medium has thereon carried one or more programs which, when executed by the electronic device, cause the electronic device to: receive a first trigger operation; in response to the first trigger operation, play a recorded target video, and display a resource identification associated with the target video during a playing process of the target video; and in response to a trigger operation on the resource identification, display received target resource information.

In the embodiment of the present disclosure, computer program code for performing the operation of the present disclosure may be written in one or more programming languages or a combination thereof, wherein the above programming language includes but is not limited to an object-oriented programming language such as Java, Small-talk, and C++, and also includes a conventional procedural programming language, such as a "C" language or a similar programming language. The program code may be executed entirely on a computer, partly on a computer, as a stand-alone software package, partly on a computer and partly on a remote computer, or entirely on a remote computer or server. In a scenario where a remote computer is involved, the remote computer may be connected to a computer through any type of network, including a local area network (LAN) or a wide area network (WAN), or may be connected to an external computer (for example, through the Internet using an Internet service provider).

The flow diagrams and block diagrams in the drawings illustrate the possibly implemented architecture, functions, and operations of the system, method and computer program product according to various embodiments of the present disclosure. In this regard, each block in the flow diagrams or block diagrams may represent a module, program segment, or part of code, which includes one or more executable instructions for implementing a specified logical function. It should also be noted that, in some alternative implementations, functions noted in blocks may occur in a different order from those noted in the drawings. For example, two blocks shown in succession may, in fact, be executed substantially concurrently, or they may sometimes be executed in a reverse order, which depends upon the functions involved. It will also be noted that each block in the block diagrams and/or flow diagrams, and a combination of the blocks in the block diagrams and/or flow diagrams, can be implemented by a special-purpose hardware-based system that performs specified functions or operations, or by a combination of special-purpose hardware and computer instructions.

The involved unit described in the embodiments of the present disclosure may be implemented by software or hardware. The name of the unit does not, in some cases, constitute a limitation on the unit itself.

The functions described above herein may be executed, at least partially, by one or more hardware logic components. For example, without limitation, a hardware logic component of an exemplary type that may be used includes: a field programmable gate array (FPGA), an application specific integrated circuit (ASIC), an application specific standard parts (ASSP), a system on chip (SOC), a complex programmable logic device (CPLD), and the like.

In the context of this disclosure, a computer-readable medium may be a tangible medium, which may contain or store a program for use by or in conjunction with an instruction execution system, apparatus, or device. The computer-readable medium may be a computer-readable signal medium or a computer-readable storage medium. The computer-readable medium may include, but is not limited to, an electronic, magnetic, optical, electromagnetic, infrared, or semiconductor system, apparatus, or device, or any suitable combination of the foregoing. More specific examples of the computer-readable storage medium include an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The above only describes the preferred embodiments of the present disclosure and an explanation of the technical principles employed. It should be appreciated by those skilled in the art that the disclosure scope involved in the present disclosure is not limited to the technical solutions formed by specific combinations of the technical features described above, but also encompasses other technical solutions formed by arbitrary combinations of the above technical features or equivalent features thereof without departing from the above disclosed concepts, for example, a technical solution formed by performing mutual replacement between the above features and technical features having similar functions to those disclosed (but not limited to) in the present disclosure.

Furthermore, while operations are depicted in a specific order, this should not be understood as requiring that these operations be performed in the specific order shown or in a sequential order. Under certain circumstances, multitasking and parallel processing might be advantageous. Similarly, while several specific implementation details are included in the above discussion, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or method logical actions, it should be understood that the subject matter defined in the attached claims is not necessarily limited to the specific features or actions described above. Rather, the specific features and actions described above are only example forms of implementing the claims.

What is claimed is:

1. A video processing method, comprising:
receiving a resource identification adding operation for a video to be posted; and
in response to the resource identification adding operation, adding a resource identification to a target video to be posted, so as to display the resource identification during a playing process of the target video and display target resource information upon receiving a trigger operation on the resource identification,
wherein after the in response to the resource identification adding operation, adding a resource identification to a target video, the method further comprises:
receiving an object identification adding operation for the video to be posted; and
in response to the object identification adding operation, adding an object identification to the target video to be posted, so as to display the object identification during the playing process of the target video and display an object transfer page upon receiving a trigger operation on the object identification, so as to perform object transfer by using a target resource corresponding to the target resource information.

2. The method according to claim 1, wherein the receiving a resource identification adding operation for a video to be posted comprises:
receiving an enabling operation acting on a resource switch of a video posting page for the video to be posted; or
receiving an adding operation for a resource sticker for the video to be posted on a video editing page.

3. The method according to claim 1, wherein the in response to the resource identification adding operation, adding a resource identification to a target video comprises:
in response to the resource identification adding operation, displaying a setting page for the resource identification;
receiving at least one piece of setting information input through the setting page, and adding the resource identification to the target video according to the at least one piece of setting information, so as to display the resource identification according to the at least one piece of setting information during the playing process of the target video.

4. A video playing method, comprising:
receiving a first trigger operation;
in response to the first trigger operation, playing a recorded target video, and displaying both a resource identification associated with the target video during a playing process of the target video and an object identification associated with the target video during the playing process;
in response to a trigger operation on the resource identification, displaying received target resource information; and
in response to a trigger operation on the object identification, displaying an object transfer page, so as to perform object transfer by using a target resource corresponding to the target resource information.

5. An electronic device, comprising: a memory and a processor, the memory being configured to store a computer program; and the processor being configured to, when executing the computer program, perform:

receiving a resource identification adding operation for a video to be posted; and in response to the resource identification adding operation, adding a resource identification to a target video to be posted, so as to display the resource identification during a playing process of the target video and display target resource information upon receiving a trigger operation on the resource identification, wherein the processor is further configured to, after the in response to the resource identification adding operation, adding a resource identification to a target video, perform:

receiving an object identification adding operation for the video to be posted; and in response to the object identification adding operation, adding an object identification to the target video to be posted, so as to display the object identification during the playing process of the target video and display an object transfer page upon receiving a trigger operation on the object identification, so as to perform object transfer by using a target resource corresponding to the target resource information.

6. A non-transitory computer-readable storage medium having thereon stored a computer program which, when executed by a processor, implements the video processing method according to claim 1.

7. The electronic device according to claim 5, wherein the processor is further configured to perform:

receiving an enabling operation acting on a resource switch of a video posting page for the video to be posted; or receiving an adding operation for a resource sticker for the video to be posted on a video editing page.

8. The electronic device according to claim 5, wherein the processor is further configured to perform:

in response to the resource identification adding operation, displaying a setting page for the resource identification;

receiving at least one piece of setting information input through the setting page, and adding the resource identification to the target video according to the at least one piece of setting information, so as to display the resource identification according to the at least one piece of setting information during the playing process of the target video.

9. An electronic device, comprising: a memory and a processor, the memory being configured to store a computer program; and the processor being configured to, when executing the computer program, perform the video playing method according to claim 4.

10. A non-transitory computer-readable storage medium having thereon stored a computer program which, when executed by a processor, implements the video processing method according to claim 2.

11. A non-transitory computer-readable storage medium having thereon stored a computer program which, when executed by a processor, implements the video processing method according to claim 3.

12. A non-transitory computer-readable storage medium having thereon stored a computer program which, when executed by a processor, implements the video processing method according to claim 5.

* * * * *